(12) United States Patent
Zhang (10) Patent No.: US 11,587,520 B2
(45) Date of Patent: Feb. 21, 2023

(54) PIXEL DRIVE CIRCUIT AND DISPLAY PANEL

(71) Applicant: TCL CHINA STAR OPTOELECTRONICS TECHNOLOGY CO., LTD., Guangdong (CN)

(72) Inventor: Zixiang Zhang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 417 days.

(21) Appl. No.: 16/759,433

(22) PCT Filed: Apr. 7, 2020

(86) PCT No.: PCT/CN2020/083538
§ 371 (c)(1),
(2) Date: Apr. 27, 2020

(87) PCT Pub. No.: WO2021/184450
PCT Pub. Date: Sep. 23, 2021

(65) Prior Publication Data
US 2022/0319459 A1    Oct. 6, 2022

(30) Foreign Application Priority Data
Mar. 16, 2020  (CN) .......................... 202010179655.5

(51) Int. Cl.
*G09G 3/36*     (2006.01)
*G02F 1/1362*   (2006.01)
(Continued)

(52) U.S. Cl.
CPC ....... *G09G 3/3648* (2013.01); *G02F 1/13624* (2013.01); *G09G 3/3607* (2013.01);
(Continued)

(58) Field of Classification Search
None
See application file for complete search history.

(56) References Cited

U.S. PATENT DOCUMENTS

2002/0159015 A1    10/2002  Seo et al.
2011/0267325 A1*   11/2011  Xi ........................ G09G 3/3648
345/98
(Continued)

FOREIGN PATENT DOCUMENTS

CN       104050885 A     9/2014
CN       104698643 A     6/2015
(Continued)

*Primary Examiner* — Shan Liu
(74) *Attorney, Agent, or Firm* — PV IP PC; Wei Te Chung; Ude Lu (57) ABSTRACT

A pixel drive circuit and a display panel are provided. According to the pixel drive circuit, a first data line and a first sharing line form a first sub pixel area, a second data line and a second sharing line form a second sub pixel area, and a third data line and a third sharing line form a third sub pixel area. The first sub pixel area, the second sub pixel area and the third sub pixel area share one scan line. The first sharing line of the first sub pixel area is connected in series with the third sharing line of the third sub pixel area.

9 Claims, 3 Drawing Sheets

(51) Int. Cl.
*G02F 1/1343* (2006.01)
*G02F 1/1337* (2006.01)
*G02F 1/1368* (2006.01)

(52) U.S. Cl.
CPC ........ *G02F 1/1368* (2013.01); *G02F 1/13439* (2013.01); *G02F 1/133746* (2021.01); *G02F 1/134345* (2021.01); *G09G 2300/0426* (2013.01); *G09G 2300/0809* (2013.01); *G09G 2320/0242* (2013.01)

(56) References Cited

U.S. PATENT DOCUMENTS

| | | | |
|---|---|---|---|
| 2013/0021564 A1* | 1/2013 | Tasaka | G02F 1/1393 349/96 |
| 2014/0225939 A1 | 8/2014 | Hasegawa | |
| 2015/0187318 A1* | 7/2015 | Kim | G09G 3/3648 345/206 |
| 2016/0246136 A1* | 8/2016 | Lim | G02F 1/134336 |
| 2016/0320676 A1* | 11/2016 | Lee | G09G 3/03 |
| 2016/0351137 A1* | 12/2016 | Lee | G09G 3/3611 |

FOREIGN PATENT DOCUMENTS

| | | |
|---|---|---|
| CN | 104834138 A | 8/2015 |
| CN | 107991818 A | 5/2018 |

\* cited by examiner

PIXEL DRIVE CIRCUIT AND DISPLAY PANEL

BACKGROUND OF THE INVENTION

1. Field of the Invention

The present disclosure relates to the field of display technology, more particularly, to a pixel drive circuit and a display panel.

2. Description of the Related Art

The vertical alignment (VA) display mode has become a common display mode for thin film transistor (TFT) liquid crystal displays (LCDs) used in large-sized TVs due to its high contrast and no friction alignment required. However, the problem of color shift at large view angles in the vertical alignment mode is an important factor that vertical alignment product design has to consider.

Owing to the applications of large-sized display devices, users may view the display devices from various angles, and the obvious color shift will reduce the quality of the panels and customer satisfaction. Currently, the technology for reducing color shift mainly adopts a multi-domain pixel design method. Each domain is consistent with the polarization direction of the upper/lower polarizer (POL). When an observer views from the front view angle, he/she can see that the main pixel electrode corresponds to the "front sides" of the liquid crystal molecules, which contributes a larger part to the brightness. The sub pixel electrode corresponds to the "sides" of the liquid crystal molecules, which contributes a lesser part to the brightness. When the observer views from a side view angle, he/she can see that the main pixel electrode corresponds to the "sides" of the liquid crystal molecules, which contributes a lesser part to the brightness. The sub pixel electrode corresponds to the "front sides" of the liquid crystal molecules, which contributes a large angle to the brightness. Therefore, the brightness contribution of the sub pixel electrode is larger when viewed from the side. As a result, a difference between viewing from the side and the front is caused after color mixing of the red (R), green (G) and blue (B) pixels due to the differences in color resist materials and divided voltages. A color shift at large view angles is apparent to seriously affect the quality of the panel.

The large-sized display devices in the related art have the serious technical problem of color shift at large view angles.

SUMMARY OF THE INVENTION

The embodiment of the present disclosure provides a pixel drive circuit and a display panel to resolve the serious technical problem that the large-sized display device in the related art has color shift at a large view angle.

In order to resolve the above problem, one aspect of the present disclosure provides a pixel drive circuit. The pixel drive circuit comprises a scan line group and a data line group perpendicularly crossing each other and a sharing line group disposed adjacent to one side of each of data lines. The data line group comprises a first data line, a second data line and a third data line arranged in sequence and parallel. The sharing line group comprises a first sharing line, a second sharing line and a third sharing line arranged in parallel. The first data line and the first sharing line form a first sub pixel area. The second data line and the second sharing line form a second sub pixel area. The third data line and the third sharing line form a third sub pixel area. The first sub pixel area, the second sub pixel area and the third sub pixel area share one scan line. The first sharing line of the first sub pixel area is connected in series with the third sharing line of the third sub pixel area.

In some embodiments of the present disclosure, the first sub pixel area comprises a first main area, a first sub area and a first sharing thin film transistor, the first main area comprises a first main thin film transistor and a first main pixel electrode, the first sub area comprises a first sub thin film transistor and a first sub pixel electrode, the second sub pixel area comprises a second main area, a second sub area and a second sharing thin film transistor, the second main area comprises a second main thin film transistor and a second main pixel electrode, the second sub area comprises a second sub thin film transistor and a second sub pixel electrode, the third sub pixel area comprises a third main area, a third sub area and a third sharing thin film transistor, the third main area comprises a third main thin film transistor and a third main pixel electrode, the third sub area comprises a third sub thin film transistor and a third sub pixel electrode, and the second sharing thin film transistor of the second sub area is independently powered.

In some embodiments of the present disclosure, a control electrode of the first main thin film transistor is connected to the scan line, a first electrode is connected to the first data line, a second electrode is connected to the first main pixel electrode, a control electrode of the second main thin film transistor is connected to the scan line, a first electrode is connected to the second data line, a second electrode is connected to the second main pixel electrode, a control electrode of the third main thin film transistor is connected to the scan line, a first electrode is connected to the third data line, a second electrode is connected to the third main pixel electrode.

In some embodiments of the present disclosure, a control electrode of the first sub thin film transistor is connected to the scan line, a first electrode is connected to the first data line, and a second electrode is connected to the first sub pixel electrode, a control electrode of the second sub thin film transistor is connected to the scan line, a first electrode is connected to the second data line, and a second electrode is connected to the second sub pixel electrode, a control electrode of the third sub thin film transistor is connected to the scan line, a first electrode is connected to the third data line, and a second electrode is connected to the third sub pixel electrode.

In some embodiments of the present disclosure, a control electrode of the first sharing thin film transistor is connected to the scan line, a first electrode is connected to the first sharing line, and a second electrode is connected to the first sub pixel electrode, a control electrode of the second sharing thin film transistor is connected to the scan line, a first electrode is connected to the second sharing line, and a second electrode is connected to the second sub pixel electrode, a control electrode of the third sharing thin film transistor is connected to the scan line, a first electrode is connected to the third sharing line, and a second electrode is connected to the third sub pixel electrode.

In some embodiments of the present disclosure, the first sub pixel area is a red sub pixel area, the second sub pixel area is a green sub pixel area, the third sub pixel area is a blue sub pixel area, a red sharing line is connected in series with a blue sharing line, and a green sharing thin film transistor is independently powered.

In some embodiments of the present disclosure, the first sub pixel area is a green sub pixel area, the second sub pixel area is a red sub pixel area, the third sub pixel area is a blue sub pixel area, a green sharing line is connected in series with a blue sharing line, and a red sharing thin film transistor is independently powered.

In some embodiments of the present disclosure, each of the first main pixel electrode, the first sub pixel electrode, the second main pixel electrode, the second sub pixel electrode, the third main pixel electrode and the third sub pixel electrode comprises four domains, an electrode in a pattern extending in eight even directions is disposed in each of the four domains, and a material of it is indium tin oxide.

In some embodiments of the present disclosure, an orientation of liquid crystal molecules in the first main pixel electrode and an orientation of liquid crystal molecules in the first sub pixel electrode, an orientation of liquid crystal molecules in the second main pixel electrode and an orientation of liquid crystal molecules in the second sub pixel electrode, an orientation of liquid crystal molecules in the third main pixel electrode and an orientation of liquid crystal molecules in the third sub pixel electrode are all at an angle of 30° to 60°.

In some embodiments of the present disclosure, the control electrode of the first main thin film transistor is a gate electrode of the first main thin film transistor, the first electrode and the second electrode of the first main thin film transistor are respectively a source electrode and a drain electrode of the first main thin film transistor.

Another aspect of the present disclosure further provides a display panel. The display panel comprises a pixel drive circuit. The pixel drive circuit comprises a scan line group and a data line group perpendicularly crossing each other and a sharing line group disposed adjacent to one side of each of data lines. The data line group comprises a first data line, a second data line and a third data line arranged in sequence and parallel. The sharing line group comprises a first sharing line, a second sharing line and a third sharing line arranged in parallel. The first data line and the first sharing line form a first sub pixel area. The second data line and the second sharing line form a second sub pixel area. The third data line and the third sharing line form a third sub pixel area. The first sub pixel area, the second sub pixel area and the third sub pixel area share one scan line. The first sharing line of the first sub pixel area is connected in series with the third sharing line of the third sub pixel area.

In some embodiments of the present disclosure, the first sub pixel area comprises a first main area, a first sub area and a first sharing thin film transistor, the first main area comprises a first main thin film transistor and a first main pixel electrode, the first sub area comprises a first sub thin film transistor and a first sub pixel electrode, the second sub pixel area comprises a second main area, a second sub area and a second sharing thin film transistor, the second main area comprises a second main thin film transistor and a second main pixel electrode, the second sub area comprises a second sub thin film transistor and a second sub pixel electrode, the third sub pixel area comprises a third main area, a third sub area and a third sharing thin film transistor, the third main area comprises a third main thin film transistor and a third main pixel electrode, the third sub area comprises a third sub thin film transistor and a third sub pixel electrode, and the second sharing thin film transistor of the second sub area is independently powered, In some embodiments of the present disclosure, a control electrode of the first main thin film transistor is connected to the scan line, a first electrode is connected to the first data line, a second electrode is connected to the first main pixel electrode, a control electrode of the second main thin film transistor is connected to the scan line, a first electrode is connected to the second data line, a second electrode is connected to the second main pixel electrode, a control electrode of the third main thin film transistor is connected to the scan line, a first electrode is connected to the third data line, a second electrode is connected to the third main pixel electrode.

In some embodiments of the present disclosure, a control electrode of the first sub thin film transistor is connected to the scan line, a first electrode is connected to the first data line, and a second electrode is connected to the first sub pixel electrode, a control electrode of the second sub thin film transistor is connected to the scan line, a first electrode is connected to the second data line, and a second electrode is connected to the second sub pixel electrode, a control electrode of the third sub thin film transistor is connected to the scan line, a first electrode is connected to the third data line, and a second electrode is connected to the third sub pixel electrode.

In some embodiments of the present disclosure, a control electrode of the first sharing thin film transistor is connected to the scan line, a first electrode is connected to the first sharing line, and a second electrode is connected to the first sub pixel electrode, a control electrode of the second sharing thin film transistor is connected to the scan line, a first electrode is connected to the second sharing line, and a second electrode is connected to the second sub pixel electrode, a control electrode of the third sharing thin film transistor is connected to the scan line, a first electrode is connected to the third sharing line, and a second electrode is connected to the third sub pixel electrode.

In some embodiments of the present disclosure, the first sub pixel area is a red sub pixel area, the second sub pixel area is a green sub pixel area, the third sub pixel area is a blue sub pixel area, a red sharing line is connected in series with a blue sharing line, and a green sharing thin film transistor is independently powered.

In some embodiments of the present disclosure, the first sub pixel area is a green sub pixel area, the second sub pixel area is a red sub pixel area, the third sub pixel area is a blue sub pixel area, a green sharing line is connected in series with a blue sharing line, and a red sharing thin film transistor is independently powered.

In some embodiments of the present disclosure, each of the first main pixel electrode, the first sub pixel electrode, the second main pixel electrode, the second sub pixel electrode, the third main pixel electrode and the third sub pixel electrode comprises four domains, an electrode in a pattern extending in eight even directions is disposed in each of the four domains, and a material of it is indium tin oxide.

In some embodiments of the present disclosure, an orientation of liquid crystal molecules in the first main pixel electrode and an orientation of liquid crystal molecules in the first sub pixel electrode, an orientation of liquid crystal molecules in the second main pixel electrode and an orientation of liquid crystal molecules in the second sub pixel electrode, an orientation of liquid crystal molecules in the third main pixel electrode and an orientation of liquid crystal molecules in the third sub pixel electrode are all at an angle of 30° to 60°.

In some embodiments of the present disclosure, the control electrode of the first main thin film transistor is a gate electrode of the first main thin film transistor, the first electrode and the second electrode of the first main thin film transistor are respectively a source electrode and a drain electrode of the first main thin film transistor.

As compared with the related art, the present disclosure adopts a new pixel drive circuit. A pixel design of eight-domain display is used to divide a single sub pixel area into four domains of the main pixel area and four domains of the sub pixel area. In addition, different voltage division combinations are used to perform voltage division on the sub pixel electrodes of the R, G and B pixels so as to adjust the magnitudes of the divided voltages of the R, G and B pixels, respectively. The color shift phenomenon of the display panel is therefore regulated to improve the phenomenon of color shift of large-sized display devices at large view angles. As a result, the product quality of the display devices is improved.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

The pixel design in the related art causes a difference between viewing from the side and the front after color mixing of the red (R), green (G) and blue (B) pixels due to the differences in color resist materials and divided voltages. A color shift at large view angles is apparent, which seriously affects the quality of the panel.

Based on the above, the embodiment of the present disclosure provides a pixel drive circuit and a display panel. A detailed description for each of them is provided as follows.

Figure 1:
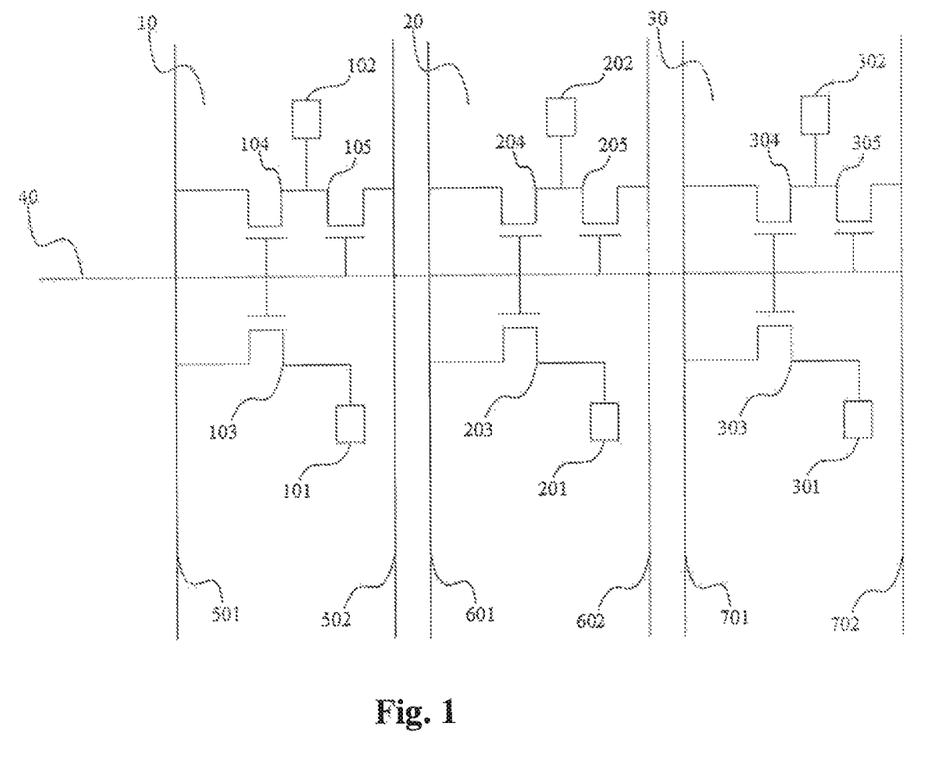
FIG 1 is a schematic diagram of a pixel drive circuit according to one embodiment of the present disclosure.

First, the embodiment of the present disclosure provides a pixel drive circuit. As shown in FIG. 1, FIG. 1 is a schematic diagram of a pixel drive circuit according to one embodiment of the present disclosure. The pixel drive circuit comprises a scan line group and a data line group perpendicularly crossing each other and a sharing line group disposed adjacent to one side of each of data lines. The data line group comprises a first data line 501, a second data line 601 and a third data line 701 arranged in sequence and parallel. The sharing line group comprises a first sharing line 502, a second sharing line 602 and a third sharing line 702 arranged in parallel.

The first data line 501 and the first sharing line 502 form a first sub pixel area 10. The second data line 601 and the second sharing line 602 form a second sub pixel area 20. The third data line 701 and the third sharing line 702 form a third sub pixel area 30.

The first sub pixel area 10, the second sub pixel area 20 and the third sub pixel area 30 share one scan line 40. The first sharing line 502 of the first sub pixel area 10 is connected in series with the third sharing line 702 of the third sub pixel area 30.

The first sub pixel area 10 comprises a first main area, a first sub area and a first sharing thin film transistor 105. The first main area comprises a first main thin film transistor 103 and a first main pixel electrode 101. The first sub area comprises a first sub thin film transistor 104 and a first sub pixel electrode 102. The second sub pixel area 20 comprises a second main area, a second sub area and a second sharing thin film transistor 205. The second main area comprises a second main thin film transistor 203 and a second main pixel electrode 201. The second sub area comprises a second sub thin film transistor 204 and a second sub pixel electrode 202. The third sub pixel area 30 comprises a third main area, a third sub area and a third sharing thin film transistor 305. The third main area comprises a third main thin film transistor 303 and a third main pixel electrode 301. The third sub area comprises a third sub thin film transistor 304 and a third sub pixel electrode 302. The second sharing thin film transistor 205 of the second sub area is independently powered.

As compared with the related art, the present disclosure adopts a new pixel drive circuit to perform voltage division on the first sub pixel electrode 102, the second sub pixel electrode 202 and the third sub pixel electrode 302 in the first sub pixel area 10, the second sub pixel area 20 and the third sub pixel area 30 by using different voltage division combinations. Magnitudes of divided voltages of the first sub pixel electrode 102, the second sub pixel electrode 202 and the third sub pixel electrode 302 are respectively adjusted so as to adjust the color shift of the display panel. The phenomenon of color shift of large-sized display devices at large view angles is thus improved to improve product quality of the display devices.

On the basis of the above embodiment, a control electrode of the first main thin film transistor 103 is connected to the scan line 40. A first electrode is connected to the first data line 501. A second electrode is connected to the first main pixel electrode 101, A control electrode of the second main thin film transistor 203 is connected to the scan line 40. A first electrode is connected to the second data line 601. A second electrode is connected to the second main pixel electrode 201. A control electrode of the third main thin film transistor 303 is connected to the scan line 40. A first electrode is connected to the third data line 701. A second electrode is connected to the third main pixel electrode 301.

A control electrode of the first sub thin film transistor 104 is connected to the scan line 40. A first electrode is connected to the first data line 501, and a second electrode is connected to the first sub pixel electrode 102. A control electrode of the second sub thin film transistor 204 is connected to the scan line 40. A first electrode is connected to the second data line 601, and a second electrode is connected to the second sub pixel electrode 202. A control electrode of the third sub thin film transistor 304 is connected to the scan line 40. A first electrode is connected to the third data line 701, and a second electrode is connected to the third sub pixel electrode 302.

A control electrode of the first sharing thin film transistor 105 is connected to the scan line 40. A first electrode is connected to the first sharing line 502, and a second electrode is connected to the first sub pixel electrode 102. A control electrode of the second sharing thin film transistor 205 is connected to the scan line 40. A first electrode is connected to the second sharing line 602, and a second electrode is connected to the second sub pixel electrode 202. A control electrode of the third sharing thin film transistor 305 is connected to the scan line 40. A first electrode is connected to the third sharing line 702, and a second electrode is connected to the third sub pixel electrode 302.

As mentioned above, the control electrodes are all gate electrodes in the thin film transistors. The first electrodes and the second electrodes may have two situations. The first electrodes are source electrodes and the second electrodes are drain electrodes. Or, the first electrodes are drain electrodes and the second electrodes are source electrodes.

In another embodiment of the present disclosure, when the display panel presents a color shift phenomenon of greenish color, the red sub pixel area is disposed as the first sub pixel area 10, the green sub pixel area is disposed as the second sub pixel area 20, and the blue sub pixel area is disposed as the third sub pixel area 30. That is, the scheme that the red sharing line 502 is connected in series with the blue sharing line 702, and the green sharing thin film transistor 205 is independently powered is adopted to ensure that the red sub pixel electrode 103 and the blue sub pixel electrode 303 have the same potential. The divided voltage of the green sub pixel electrode 203 is thus able to be adjusted separately. When the color shift is more serious, the voltage of the green sub pixel electrode 203 can be reduced or the voltages of the red sub pixel electrode 103 and the blue sub pixel electrode 303 can be increased to reduce the ratio of the green light in the mixed light when viewed from the side to resolve the phenomenon that the display panel is greenish.

In another embodiment of the present disclosure, when the display panel presents a color shift phenomenon of reddish color, the green sub pixel area is disposed as the first sub pixel area 10, the red sub pixel area is disposed as the second sub pixel area 20, and the blue sub pixel area is disposed as the third sub pixel area 30. That is, the scheme that the green sharing line 502 is connected in series with the blue sharing line 702, and the red sharing thin film transistor 205 is independently powered is adopted to ensure that the green sub pixel electrode 103 and the blue sub pixel electrode 303 have the same potential. The divided voltage of the red sub pixel electrode 203 is thus able to be adjusted separately. When the color shift is more serious, the voltage of the red sub pixel electrode 203 can be reduced or the voltages of the green sub pixel electrode 103 and the blue sub pixel electrode 303 can be increased to reduce the ratio of the red light in the mixed light when viewed from the side to resolve the phenomenon that the display panel is reddish.

Similarly, when the display panel presents a color shift phenomenon of bluish color, the red sharing line is connected in series with the green sharing line, and the blue sharing thin film transistor is independently powered. The detailed measures may refer to the description when the display panel is greenish or reddish, and a description in this regard is not provided here. The first sub pixel area 10 and the third sub pixel area 30 may be interchanged. After the series connection, the potentials of the first sharing line 502 and the third sharing line 702 are the same, which does not affect the display effect.

The first sub pixel area 10, the second sub pixel area 20 and the third sub pixel area 30 respectively display a first color, a second color and a third color. When the second color of the display panel is too much, the scheme that the first sharing line 502 is connected in series with the third sharing line 702, and the second sharing thin film transistor 205 is independently powered is adopted to ensure that the first sub pixel electrode 103 and the third sub pixel electrode 303 have the same potential. The divided voltage of the second sub pixel electrode 203 is thus able to be adjusted separately. When the color shift is more serious, the voltage of the second sub pixel electrode 203 can be reduced or the voltages of the first sub pixel electrode 103 and the third sub pixel electrode 303 can be increased to reduce the ratio of the second color in the mixed light when viewed from the side to resolve the phenomenon that the second color of the display panel is too much. The first color, the second color and the third color are respectively red color, green color and blue color, and the corresponding order may be reversed.

Figure 2:
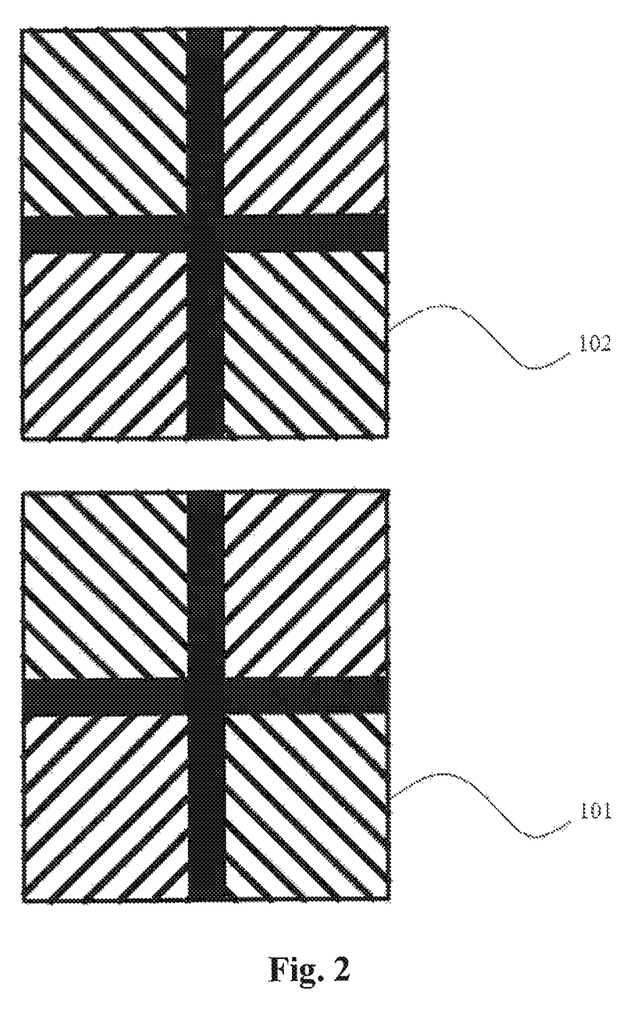
FIG. 2 is a top schematic diagram of a first main pixel electrode and a first sub pixel electrode according to one embodiment of the present disclosure.

As shown in FIG. 2, FIG. 2 is a top schematic diagram of a first main pixel electrode and a first sub pixel electrode according to one embodiment of the present disclosure. Each of the first main pixel electrode 101 and the first sub pixel electrode 102 comprises four domains. An electrode in a pattern extending in eight even directions is disposed in each four domains. In greater detail, each of the first main pixel electrode 101 and the first sub pixel electrode 102 comprises a strip-shaped vertical trunk, a strip-shaped horizontal trunk, and a plurality of oblique strip-shaped branches. A center of the vertical trunk and a center of the horizontal trunk perpendicularly intersect to evenly divide an area of an entire pixel into four areas. The four areas are the four domains. A plurality of oblique strip-shaped branches are distributed in each of the domains, and a material of them is indium tin oxide.

Figure 3:
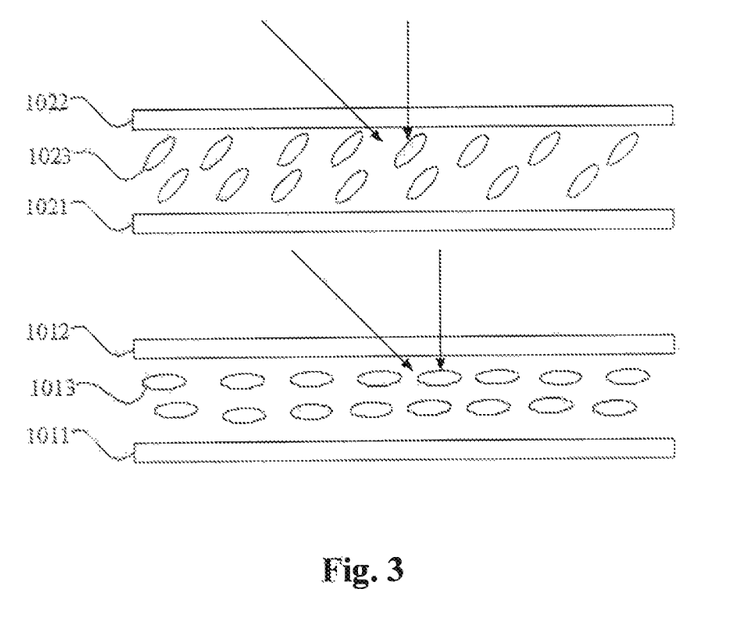
FIG. 3 is a structural schematic diagram of a first main pixel electrode and a first sub pixel electrode according to one embodiment of the present disclosure.

In order to further improve the color shift and increase the difference between the main pixel electrode and the sub pixel electrode, it is preferable as follows. As shown in FIG. 3, FIG. 3 is a structural schematic diagram of a first main pixel electrode and a first sub pixel electrode according to one embodiment of the present disclosure, The first main pixel electrode 101 comprises a first main pixel lower electrode 1011, a first main pixel upper electrode 1012 and first main pixel liquid crystal molecules 1013. The first sub pixel electrode 102 comprises a first sub pixel lower electrode 1021, a first sub pixel upper electrode 1022 and first sub pixel liquid crystal molecules 1023. An orientation of the first main pixel liquid crystal molecules 1013 and an orientation of the first sub pixel liquid crystal molecules 1023 are at an angle of 30° to 60°. When an observer views the display panel from the front view angle, the orientation of the first main pixel liquid crystal molecules 1013 faces the observer, and the orientation of the first sub pixel liquid crystal molecules 1023 is that their sides face the observer. When the observer views the display panel from a side view angle, the orientation of the first main pixel liquid crystal molecules 1013 is that their sides face the observer, and the orientation of the first sub pixel liquid crystal molecules 1023 faces the observer. In this manner, an observation at a larger angle can be achieved without the phenomenon of color shift.

The above improvements on the first main pixel electrode 101 and the first sub pixel electrode 102 are similarly applicable to the second main pixel electrode 201 and the second sub pixel electrode 202, the third main pixel electrode 301 and the third sub pixel electrode 302.

That is, each of the first main pixel electrode 101, the first sub pixel electrode 102, the second main pixel electrode 201, the second sub pixel electrode 202, the third main pixel electrode 301 and the third sub pixel electrode 302 comprises four domains. An electrode in the pattern extending in eight even directions is disposed in each of the four domains, and a material of it is indium tin oxide.

The orientation of the liquid crystal molecules in the first main pixel electrode 101 and the orientation of the liquid crystal molecules in the first sub pixel electrode 102, an orientation of liquid crystal molecules in the second main pixel electrode 201 and an orientation of liquid crystal molecules in the second sub pixel electrode 202, an orientation of liquid crystal molecules in the third main pixel electrode 301 and an orientation of liquid crystal molecules in the third sub pixel electrode 302 are all at an angle of 30° to 60°.

In order to better implement the pixel drive circuit according to the embodiment of the present disclosure, a display panel is further provided according to the embodiment of the present disclosure on the basis of the pixel drive circuit. Through using the pixel drive circuit described in the above embodiment, the performance of the display panel is further improved.

Above are embodiments of the present invention, which does not limit the scope of the present invention. Any modifications, equivalent replacements or improvements within the spirit and principles of the embodiment described above should be covered by the protected scope of the invention.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A display panel comprising a plurality of pixel drive circuits, each of the pixel drive circuits comprising:
a scan line and a data line group perpendicularly crossing each other, the data line group comprising a first data line, a second data line and a third data line arranged in sequence and parallel; and
a sharing line group disposed adjacent to one side of each of data lines, the sharing line group comprising a first sharing line, a second sharing line and a third sharing line arranged in parallel;
wherein the first data line and the first sharing line form a first sub pixel area, the second data line and the second sharing line form a second sub pixel area, and the third data line and the third sharing line form a third sub pixel area;
wherein the first sub pixel area, the second sub pixel area and the third sub pixel area share the scan line, the first sharing line of the first sub pixel area is connected in series with the third sharing line of the third sub pixel area;
wherein the first sub pixel area comprises a first main area, a first sub area, and a first sharing thin film transistor, the first main area comprises a first main thin film transistor and a first main pixel electrode, the first sub area comprises a first sub thin film transistor and a first sub pixel electrode, the second sub pixel area comprises a second main area, a second sub area, and a second sharing thin film transistor, the second main area comprises a second main thin film transistor and a second main pixel electrode, the second sub area comprises a second sub thin film transistor and a second sub pixel electrode, the third sub pixel area comprises a third main area, a third sub area, and a third sharing thin film transistor, the third main area comprises a third main thin film transistor and a third main pixel electrode, the third sub area comprises a third sub thin film transistor and a third sub pixel electrode, and the second sharing thin film transistor of the second sub area is independently powered;
wherein the first sub pixel area, the second sub pixel area, and the third sub pixel area respectively display a first color, a second color, and a third color;
wherein the respective scan lines of the pixel drive circuits are connected in series and the respective data line groups of the pixel drive circuits are arranged in sequence and parallel; and
wherein the respective sharing line groups of the pixel drive circuits are arranged in sequence and parallel and configured to improve a color shift phenomenon of the display panel.

2. The display panel as claimed in claim 1, wherein a control electrode of the first main thin film transistor is connected to the scan line, a first electrode is connected to the first data line, a second electrode is connected to the first main pixel electrode, a control electrode of the second main thin film transistor is connected to the scan line, a first electrode is connected to the second data line, a second electrode is connected to the second main pixel electrode, a control electrode of the third main thin film transistor is connected to the scan line, a first electrode is connected to the third data line, a second electrode is connected to the third main pixel electrode.

3. The display panel as claimed in claim 2, wherein each of the first main pixel electrode, the first sub pixel electrode, the second main pixel electrode, the second sub pixel electrode, the third main pixel electrode and the third sub pixel electrode comprises four domains, an electrode in a pattern extending in eight even directions is disposed in each of the four domains, and a material of it is indium tin oxide.

4. The display panel as claimed in claim 2, wherein the control electrode of the first main thin film transistor is a gate electrode of the first main thin film transistor, the first electrode and the second electrode of the first main thin film transistor are respectively a source electrode and a drain electrode of the first main thin film transistor.

5. The display panel as claimed in claim 1, wherein a control electrode of the first sub thin film transistor is connected to the scan line, a first electrode is connected to the first data line, and a second electrode is connected to the first sub pixel electrode, a control electrode of the second sub thin film transistor is connected to the scan line, a first electrode is connected to the second data line, and a second electrode is connected to the second sub pixel electrode, a control electrode of the third sub thin film transistor is connected to the scan line, a first electrode is connected to the third data line, and a second electrode is connected to the third sub pixel electrode.

6. The display panel as claimed in claim 1, wherein a control electrode of the first sharing thin film transistor is connected to the scan line, a first electrode is connected to the first sharing line, and a second electrode is connected to the first sub pixel electrode, a control electrode of the second sharing thin film transistor is connected to the scan line, a first electrode is connected to the second sharing line, and a second electrode is connected to the second sub pixel electrode, a control electrode of the third sharing thin film transistor is connected to the scan line, a first electrode is connected to the third sharing line, and a second electrode is connected to the third sub pixel electrode.

7. The display panel as claimed in claim 1, wherein the first sub pixel area is a red sub pixel area, the second sub pixel area is a green sub pixel area, the third sub pixel area is a blue sub pixel area, a red sharing line is connected in series with a blue sharing line, and a green sharing thin film transistor is independently powered.

8. The display panel as claimed in claim 1, wherein the first sub pixel area is a green sub pixel area, the second sub pixel area is a red sub pixel area, the third sub pixel area is a blue sub pixel area, a green sharing line is connected in series with a blue sharing line, and a red sharing thin film transistor is independently powered.

9. The display panel as claimed in claim 1, wherein an orientation of liquid crystal molecules in the first main pixel electrode and an orientation of liquid crystal molecules in the first sub pixel electrode, an orientation of liquid crystal molecules in the second main pixel electrode and an orientation of liquid crystal molecules in the second sub pixel electrode, an orientation of liquid crystal molecules in the third main pixel electrode and an orientation of liquid crystal molecules in the third sub pixel electrode are all at an angle of 30° to 60°.

* * * * *